Jan. 27, 1970  J. J. IRLANDI  3,491,943

DEMURRAGE CALCULATOR APPARATUS

Filed Dec. 1, 1967  2 Sheets-Sheet 1

INVENTOR.
JAMES J. IRLANDI
BY
ATTORNEYS

Jan. 27, 1970          J. J. IRLANDI          3,491,943
DEMURRAGE CALCULATOR APPARATUS
Filed Dec. 1, 1967                    2 Sheets-Sheet 2

INVENTOR.
JAMES J. IRLANDI
BY
ATTORNEYS

United States Patent Office 3,491,943
Patented Jan. 27, 1970

3,491,943
DEMURRAGE CALCULATOR APPARATUS
James J. Irlandi, 300 W. Douglas,
Wichita, Kans. 67202
Filed Dec. 1, 1967, Ser. No. 687,219
Int. Cl. G06c 3/00
U.S. Cl. 235—87                    6 Claims

ABSTRACT OF THE DISCLOSURE

The invention relates to a demurrage calculator apparatus having a frame with a circular, rotatable drum connected thereto; a viewing support connected to the frame; an elongated continuous calendar chart secured to the outer peripheral surface of the drum so as to be selectively movable relative to the viewing support; and demurrage calculator chart members selectively mountable in the viewing support movable transversely of the calendar chart member to efficiently and effectively determine the demurrage charge by ready comparison of the first and last dates of retention of the freight car, vessel, or the like.

Numerous types of calculating devices are known to the prior art for arriving at interest factors chargeable for a period of time relative to a given number of days, months, or years; however, these known devices exhibit a number of drawbacks, requiring the operator to compute the time differential element independently and must ascertain another interest multiplication figure being difficult to use. Additionally, numerous devices are available for chronological investigation to determine the cyclic or non-cyclic events in specific years through the use of operably associated calendar sections to compensate for a common year or leap year and requires numerous calendar sheets due to the seven different years and seven different leap years requiring fourteen different calendars. There is no known device in the prior art usable to efficiently and effectively calculate demurrage on either domestic or export retention of vessels, freight cars, and the like as the same must take into account the detention and release dates relative to free periods, holidays, and weekends.

In one preferred specific embodiment of the demurrage calculator apparatus of this invention, a frame means is provided having a rotatable drum means connected thereto and viewing support means mounted thereon. The viewing support means is placed adjacent the outer peripheral surface of the drum means. An elongated endless calendar chart member is provided starting with the appropriate first day of the year and following through with consecutively numbered indica to the last day of the year and having the same arranged in appropriate columns, namely seven, according to the days of the week. The calendar chart member is secured as by adhesive or the like to the rotatable drum means and friction brake members are provided between the drum means and the frame means so that the drum means rotates with some resistance. A pair of demurrage calculator charts are provided, one for domestic and the other for export calculations, which are selectively mountable on the viewing support means so as to be movable parallel to the axis and transversely of the drum means in adjacent relationship to its outer periphery. The viewing support means is provided with a slide member movable about the periphery of the drum means to align with rows on the calendar chart member. More specifically, the domestic demurrage chart member is referred to as an average agreement calculator and is constructed of a transparent material so that the indicia on the calender chart member can be seen therethrough. The domestic calculator chart is provided with horizontally extended rows having numerical indica and various symbolic indicia are provided to be placed over the numerical indicia on the calendar chart member to obtain demurrange charge therefrom. The domestic calculator chart its moved laterally within the viewing support means so as to place the desired one on the symbolic indicia over the calendar indicia on which the freight car or vessel was placed on the freighter's location so as to have a beginning point therefrom. The slide member is movable about the periphery of the drum means so as to reveal the desired calendar indicia of ceasing freight car or vessel detention to read therefrom the total demurrage costs. The domestic chart calculator is also provided with numerous instruction indicia thereon to indicate proper usage of the entire mechanism. The export demurrage calculator is also provided with a plurality of symbolic indicia and numerical indicia operable in a similar manner as described above for the domestic demurrage calculator. The primary differences in usage is that on export demurrage operations, the freighter is given extra days for loading and unloading and such must be compensated.

Accordingly, it is an object of this invention to provide a new and novel demurrage calculator apparatus overcoming the above-mentioned disadvantages of the prior art devices.

Another object of this invention is to provide a demurrage calculator apparatus that is compact in structure, attractive in appearance, and providing a durable easily usable structure.

A further object of this invention is to provide a demurrage calculator apparatus having a frame means with a rotatable drum member thereon; a calendar chart member mounted about the drum member to provide an endless calendar thereon; a demurrage calculator chart mountable upon said frame means operable to be moved transversely of the calendar chart member which may also be rotated transversely thereto; and the demurrage calculator chart member having a plurality of indicia thereon to indicate the resultant charges for demurrage fees.

One other object of this invention is to provide a new and novel demurrage calculator chart member readily usable within an elongated endless calendar member whereupon one need only place a portion of the demurrage calculator chart on the date of placement of the vessel or freight car from the time charges are to be incurred and readily read therefrom the resultant total charges depending upon the date the retention ceases with the calculator compensating for free time, weekends, and holidays.

One other object of this invention is to provide a demurrage calculator apparatus operable for either domestic or export demurrage charges and providing a structure that is easy to use, economical to manufacture, and substantially foolproof in operation.

Various other objects, advantages and features of this invention will become apparent to those skilled in the art from the following discussion and description taken in conjunction with accompanying drawings, in which:

FIG. 3 is a fragmentary front elevational view of the calculator apparatus of this invention having an export calculator chart mounted thereon;

FIG. 4 is a view similar to FIG. 3 illustrating the use of the calculator apparatus with an average agreement or domestic calculator chart thereon; and FIG. 5 is a fragmentary view similar to FIG. 4 illustrating another condition using the domestic calculator chart of this invention during a holiday period.

The following is a discussion and description of preferred specific embodiments of the demurrage calculator apparatus of this invention, such being made with reference to the drawings whereupon the same reference numerals are used to indicate the same or similar parts and/or structures.

Figure 1:
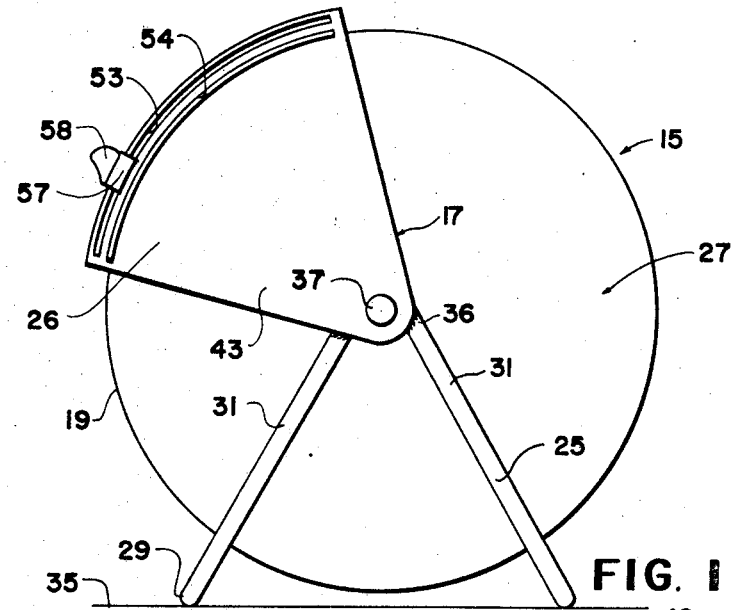
FIG. 1 is a side elevational view of the demurrage calculator apparatus of this invention.
Figure 2:
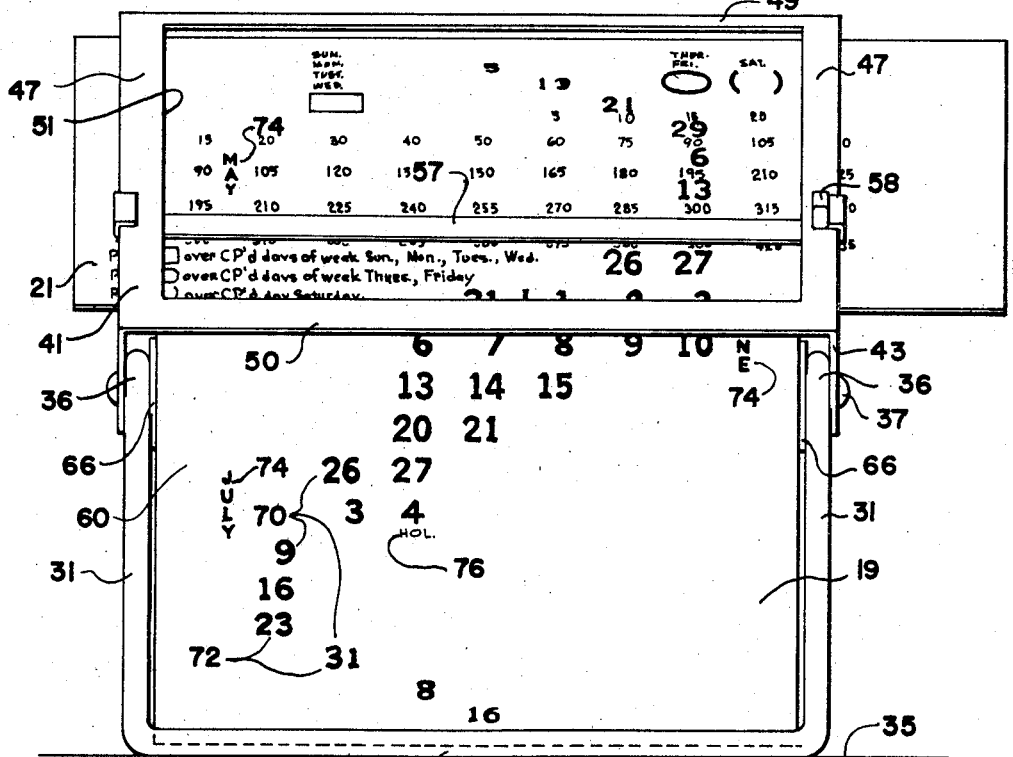
FIG. 2 is a front elevational view of the demurrage calculator apparatus of this invention.

Referring to the drawings in detail and in particular to FIG. 1, a demurrage calculator apparatus, indicated generally at 15, includes a calculator frame means 17; a calendar chart member 19 mounted on the frame means 17; and a domestic calculator chart member 21 and an export calculator chart member 23 selectively mountable on the frame means 17 and operably connected to the calendar chart member 19 to readily indicate charges for demurrage in a manner to be explained.

The frame means 17 includes a support assembly 25 having a viewing support structure 26 secured thereto and a rotatable chart support or drum means 27 connected to the support assembly 25. More specifically, the support assembly 25 includes an irregularly bent main body 29 having downwardly diverging support legs 31 of V-shape, each having a lowermost base portion 33 adapted to be supported upon the upper surface 35 of a table or the like. An upper, integral V-shaped portion 36 of the support legs 31 is adapted to receive an elongated support shaft 37 therethrough upon which the drum means 27 is rotatably mounted. The viewing support structure 26 includes a main viewing frame 41 having laterally extended support flange sections 43 at opposite ends thereof with the flange sections 43 adapted to be secured to the respective outermost ends of the shaft 37 as by riveting, welding, or the like. As seen in FIG. 1, the support flange sections 43 are inclined upwardly from the shaft 37 and having an innermost V-shaped portion secured as by welding to the support legs 31 for rigidity.

The main viewing frame 41 is of an arcuate shape having outer parallel side members 47 interconnected by top and bottom members 49 and 50 to provide an inner enlarged opening 51 of generally rectangular shape. Adjacent the side members 47, each of the flange sections 43 are provided with arcuate slots 53 and 54 for reasons to be explained. The enlarged opening 51 can be covered with a glass or transparent covering as desired to maintain a neat and attractive appearance. The uppermost slot 53 is adapted to receive opposite ends of an elongated slide member 57 adapted to move between and transversely of the side members 47. The opposite ends of the slide member 57 are reversely bent so as to be engageable in a clamped relationship with the outer surfaces of the flange sections 43 to be slidably movable in the slot 53 in a parallel relationship to the top and bottom members 49 and 50 and radially of the shaft 37. One side of the slide member 57 is provided with a special tab section 58 adapted to receive one's thumb thereagainst for readily moving the same evenly in the upper slots 53.

The drum means 27 includes a drum member 60 of a generally cylindrical shape having an axially extended hole (not shown) therein adapted to receive the support shaft 37 so that the same can be rotatable thereabout. Frictional washer members 66 are placed between the drum member 60 and the adjacent support legs 31 adjacent the shaft 37 so as to achieve resistive movement of the rotatable drum member 60. The radius of the drum member 60 is of a size to place the outer periphery adjacent the inner most portion of the inner slot 54. Additionally, the drum member 60 is of a diameter to receive the calendar chart member 19 thereabout to form a continuous yearly calendar thereon.

The calendar chart member 19 may be of an elongated rectangular strip shape or constructed in a cylinder shape so as to be readily mountable on the drum member 60 as desired. The calendar chart member 19 is divided into aligned horizontal and vertical lines to indicate the total number of days in a year plus the monthly indicia thereof. The uppermost horizontal line starts with the month of January and is provided with numerical consecutive date indicia 70 to indicate the days of this month and continued thereafter to provide indicia for the month of February, March, December, whereupon the elongated calendar presents continuous uninterrupted indicia from the first day to the last day of the pertinent year. Additionally, there are seven vertical columns 72 identified by day indicia starting with Sunday and proceeding to the right to the final day of the week, namely Saturday. Under the proper day indicia 70 in the columns 72, it is seen that each day of the year that falls on, for example, Wednesday is listed in this vertical column in a continuous manner. A monthly indicia 74 is provided on the left and right hand sides of the outermost ones of the vertical columns 72 of the date indicia 70 and are adapted to present the proper indication of the month involved therein. Additionally, the calendar chart member 19 is provided with holiday indicia 76 being the abbreviation "HOL." beneath the pertinent dates of all the days throughout the year in which a holiday is normally observed by those in the freight moving profession. It is obvious that this calendar chart member 19 may be of an elongated rectangular shape to be wrapped about the outermost peripheral surface of the drum member 60 or may be even an continuous elongated chart presenting many years thereon which can be revolved about the outer surface of the drum member 60 as required.

As shown in FIG. 3, the export demurrage calculator chart 23 is of a generally rectangular shape and preferably constructed of a transparent material such as polyethylene plastic or the like. The chart 23 is provided with indicia 79 identifying the chart, namely "Export Demurrage Calculator" and a plurality of numerical demurrage indicia 80 arranged in five horizontal rows 82 and also arranged in vertical columns 83 numbering eleven. The demurrage indicia 80 is pre-determined to set forth the charges for holding vessels, freight cars, and the like past a "free period' 'which is normally given to the freighter for unloading and loading purposes. The uppermost or first horizontal row 82 is provided with only five individual demurrage indicia 80 adjacent the right hand side thereof for reasons to become obvious. The export demurrage calculator chart 23 is additionally provided with symbolic indicia 84, 85, and 87 usable with certain days and under certain conditions as will be explained. For example, it is seen that the symbolic indicia 84 is of an oval-shape placed above the third vertical column 83 from the right and is provided with day indicia 88, being "Thursday and Friday" thereabove. Adjacent the indicia 80 above the second vertical column 83 from the right is positioned the symbolic indicia 85 presented in the form of brackets and having day indicia 88 thereabove indicating "Saturday." Additionally, the third symbolic symbol 87 is provided above the fourth vertical column 83 from the left and is of a generally rectangular shape. Above this rectangular symbolic indicia 87 is day indicia 88 of "Sunday, Monday, Tuesday, Wednesday" indicating its usage in a manner to be explained. Also, it is seen that instruction indicia 91 is provided at the bottom portion of the calculator chart 23 which provides instructions for properly using the right symbolic indicia 84, 85, and 87. The instruction indicia 91 states that "CP'D 7 a.m. Time Starting as of that day follow instructions and move indicator one day to the left," which sets forth the shipping requirement that normally provides for the starting of charge days permitted for loading and unloading if the car is CP'D meaning "Constructure Placement" as of this particular 7 a.m. time. Additionally, as shown by the indicator, if a holiday occurs within the "free time" period, you are to move the calculator one day to the right which actually compensates for the free period or holiday period in which persons are normally not working and not loading and unloading.

As shown in FIG. 4, the average agreement or domestic calculator chart 21 is substantially similar having horizontal rows 95 and vertical columns 96 and demurrage charge indicia 97 similar to the previously described indicia 80 except of different values due to the variation in charges between domestic and export demurrage rates. Additionally, the chart 21 is provided with three symbolic indicia 99, 101, and 103 with a first symbolic indicia 99 of a generally oval-shape placed above the fifth vertical upright column 96 from the right and having the day indicia 88 reading "Tuesday, Wednesday, Thursday, and Friday" placed thereabove. Adjacent thereto is the second symbolic indicia 101 of bracket shape having the day indicia 88, namely "Sunday" placed thereabove. The third symbolic indicia 103 is placed over the second vertical column 96 from the left and is of a generally rectangular shape having the day indicia 88, namely "Sunday and Monday" mounted thereover. The average agreement calculator chart 21 is provided with six of the horizontal rows 95 with the upper most row having one special charge indicia 105 placed in the second vertical column 96 from the right and having operation indicia 106 placed adjacent thereto in brackets reading "Tuesday charges only." The calculator chart 21 is additionally provided with the previously described instruction indicia 91 for the export demurrage calculator chart 23 whereupon this indicia 91 is operable in a manner as previously described.

In the use and operation of the demurrage calculator apparatus 15 of this invention, we shall assume the calendar chart member 19 is provided for the year "1967" and also we shall concern ourselves with the month of September. Additionally, in the first example of FIG. 3, we shall assume that a car was CP'D, namely constructive placement, on Friday Sept. 1, 1967, whereupon the date of the calendar chart 19 being "1" and the same being a "Friday," the symbolic indicia 84 is thereupon placed over the numerical date indicia 70 by lateral movement of the export demurrage calculator chart 23 and rotation of the drum member 60 as required to place the same into alignment as shown in FIG. 3. Next, we shall assume that the constructive placement was over on the 20th of September, whereupon the vessel or freight car was released from usage and detention whereupon reading the date indicia 70 of the 20th of September with the demurrage charge indicia 80 thereover it is seen that the freighter would appear to owe a total of $60. However, upon reading our instruction indicia 91, it is seen that if a "holiday occurs within the free time move calculator one day to the right," whereupon moving the demurrage calculator chart 23 to the right one space, it is seen that this is indicated by the symbolic indicia 87 as shown in dotted lines over the date indicia 70, namely the 4th of September which is actually the holiday in question. When this is done, it is seen that the date indicia 70 being the 20th day of September now has the demurrage charge indicia 80 thereover indicating a charge of $50. In practice it is seen that the export demurrage calculator chart 23 is operable to compensate for weekends and holidays which are not counted as part of the free time allotted to the freighter for loading and unloading his vessel or freight car. Therefore, this chart automatically compensates for these days on the proper placement of the symbolic indicia 84, 85, or 87 over the upper numerically consecutive date indicia 70.

As shown in FIG. 4, the domestic calculator chart 21 is operable in a substantially similar manner and we shall assume the month of September and that a car has constructive placement on the date of Sept. 5, 1967, the same being a Tuesday. The export demurrage chart 23 is readily replaced within the viewing frame 41 by the calculator chart 21 whereupon the same is laterally movable therein. It is seen that the first symbolic indicia 99 is operable when used as indicated by the day indicia 88 for Tuesdays, Wednesdays, Thursdays, and Fridays and, therefore, the same is moved laterally with corresponding rotational movement of the drum member 60 to place the symbolic indicia 99 over the numerical data indicia 70 (5) of the proper month, namely September 1967. We will assume that the vessel or freight car is returned to the shipper on the 8th of September that there is indicated above this date the indicia 106, for a "Tuesday charge only" indicating that the freighter has a demurrage charge indicated by the indicia 97 of $5.00. This is appropriate as on the calculator chart 21, the freighter is allowed two free days on which to load and unload the freight car or vessel and such would be accurate in providing Wednesday and Thursdays as free whereupon Friday the 8th is given the appropriate charge. In this same situation, let's assume that the freight car or vessel is not returned to the freighter until the 27th day of September 1967 whereupon the demurrage charge indicia 97 over the appropriate date indicia 70, namely the date of the 27th, inclusive a charge to the freighter of $210.00.

As shown in FIG. 5, assume that the vessel or freight car is placed on Saturday, Sept. 2, 1967 whereupon the symbolic indicia 101, namely the brackets, are placed about the date indicia 70 on proper lateral movement of the calculator chart 21 and rotational movement of the drum member 60. This would indicate that there are no charges on the vessel or freight car placed on Saturday, Sept. 2, which is normally a non-working day whereupon Monday and Tuesday would be free time and the charges would begin on Wednesday, Sept. 6, 1967. However, it is further noted that the holiday, namely Sept. 4, 1967, falls within the free time whereupon, according to the instruction indicia 91, the chart is to be moved one space to the right whereupon it is seen that the first day of charge begins on Thursday, Sept. 7 instead of Wednesday, Sept. 6. This readily compensates for the holiday at which time it assumed that the freighter is not working and will not have an opportunity to load or unload his vessel or freight car. It is seen that the plurality of horizontal and vertical rows on the demurrage calculator charts 21 and 23 provide for the readily lateral movement thereof to automatically indicate the proper charges to be made compensating for free periods, holidays, and weekends.

It is seen that the demurrage calculator apparatus 15 of this invention provides a compact structure having a new and novel feature readily usable by one to automatically compensate demurrage charges allowing for holiday and weekends. It is noted that the slide member 57 is movable about the periphery of the drum member 60 within the upper slot 53 and maintained in a horizontal position relative thereto so as to cover up the lower portions of the horizontal charge indicia not being used so that one may readily move the same to a proper horizontally extended row of the date indicia 70 to readily receive the demurrage charge indicated by the indicia 80, 97. It is seen that the demurrage calculator apparatus 15 presents a new and novel calculating structure which is simple to use, economical to manufacture, and is proven to be a time saving and, therefore, monetary saving device.

As will be apparent from the foregoing discussion of preferred embodiments of the applicant's demurrage calculator apparatus, a relatively simple and inexpensive structure has been provided which is easily usable with a minimum of instruction for usage in calculating demurrage charges which previously has been a time consuming, tedious, and error involved operation. The applicant's invention achieves the calculation required without the use of numerous monthly calendar members and special manuals setting forth the prevalent demurrage charges.

As will be obvious to those skilled in the art, various changes and modifications of the preferred calculator apparatus as disclosed herein can be made or followed without departing from the spirit of the disclosure.

I claim:
1. A demurrage calculator apparatus, comprising:
   (a) a frame means having a support section, a chart support structure mounted on said support section, a viewing frame mounted on said support section in overlying relationship to said chart support structure,
   (b) a calendar chart member mounted on said chart support structure and movable transversely of said viewing frame means, said calendar chart having rows of consecutive date indicia extended parallel to said viewing frame,
   (c) a demurrage chart member constructed of a transparent material mounted is said viewing frame, said demurrage chart member being movable axially and transversely of said calendar chart member, said demurrage chart member having symbol indicia, and a plurality of longitudinally extended rows of demurrage indicia, said demurrage chart member movable transversely of said calendar chart member to align pre-selected ones of said symbol indicia over said date indicia to indicate time at which the demurmage charge is to begin, and
   (d) said rows of said demurrage indicia and said date indicia associated one adjacent the other when said symbol indicia is placed in overlying alignment with said date indicia whereby the resultant demurrage charge is indicated by said demurrage indicia over a specific one of said date indicia, the latter being the date of release of goods held in detention and cessation of charges therefor.

2. A demurrage calculator apparatus as described in claim 1, wherein:
   (a) said support section having downwardly diverging legs engageable with a support surface,
   (b) said viewing frame including a main rectangular body with flange sections having inner ends secured to said legs,
   (c) said main body having an enlarged opening to view a portion of said calendar chart member therethrough, and
   (d) said flange section having slotted openings to receive said demurrage chart member therethrough for transverse movement relative said calendar chart member.

3. A demurrage calculator apparatus as described in claim 2, wherein:
   (a) said chart support structure having an elongated shaft secured to said legs and a drum member rotatably mounted thereon, and
   (b) said calendar chart member mounted about the periphery of said drum member to place a portion thereof adjacent said enlarged opening whereby said calendar chart member and said demurrage chart member are movable perpendicular to each other to align anyone of said date indicia with a given one of said symbol indicia for calculation of demurrage charge.

4. A demurrage calculator apparatus as described in claim 2, wherein:
   (a) said viewing frame having a slide member extended across said opening parallel said rows of said date indicia operable to isolate and align appropriate rows of said date indicia and said demurrage indicia.

5. A demurrage calculator apparatus as described in claim 1, wherein:
   (a) said demurrage chart member having day indicia above respective ones of said symbol indicia indicative of respective ones to be used with corresponding days of said date indicia on said calendar chart member,
   (b) said rows of said demurrage indicia having individual ones thereof aligned in respective columns, and
   (c) said demurrage chart member having instruction indicia setting forth the operation of said calculator apparatus taking into account special conditions of holidays, weekends, and free time.

6. A demurrage calculator apparatus as described in claim 1, wherein:
   (a) said calendar chart member having said date indicia arranged in seven separate columns extended perpendicular to said rows of said date indicia, each of said columns indicative of a respective week day; and month indicia on said calendar chart member to separate the adjacent said rows of said date indicia into proper grouping of the particular month involved,
   (b) said demurrage chart member having instruction indicia setting forth steps of operation of said calulator apparatus, and
   (c) said calendar chart member having holiday indicia thereon indicative of the legal holidays placed adjacent appropriate ones of said date indicia thereby setting forth with said instruction indicia special conditions of use and operation during holidays, free time, and weekends of the demurrage calculator apparatus of this invention.

References Cited

UNITED STATES PATENTS

| 745,167 | 11/1903 | Duncan | 235—87 |
| 894,042 | 7/1908 | O'Brien | 235—87 |
| 1,113,801 | 10/1914 | MacLean | 235—87 |
| 1,614,583 | 1/1927 | Zimmerman | 235—35 |
| 2,630,271 | 3/1953 | Ayres | 235—87 |
| 3,028,082 | 4/1962 | Clark | 235—87 |

FOREIGN PATENTS 258,324      Italy.

RICHARD B. WILKINSON, Primary Examiner

STANLEY A. WAL, Assistant Examiner